Figure 1:
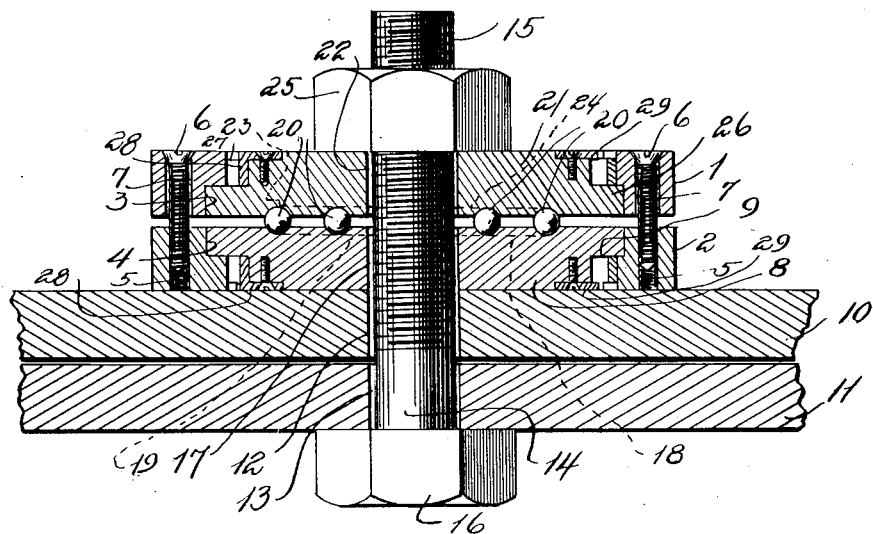

Sept. 26, 1933.　　　D. M. MAHONEY　　　1,928,182

WASHER

Filed Aug. 6, 1931

Inventor

Daniel M. Mahoney

By Mason Fenwick & Lawrence

Attorneys

Patented Sept. 26, 1933

1,928,182

UNITED STATES PATENT OFFICE 1,928,182

WASHER

Daniel M. Mahoney, Oakland, Calif.

Application August 6, 1931. Serial No. 555,615

3 Claims. (Cl. 85—50)

This invention relates to friction lock washer adapted to be inserted on the shank of a bolt between the nut and two or more elements to be clamped together, in order to lock said elements securely in such clamped position.

The main object of the invention is to provide a washer which will permit very full rotation of the nut; seated thereon, in the locking direction, but which will offer great resistance to rotation of the nut in the release direction.

Other objects of the invention will become apparent as the detailed description thereof proceeds.

Figure 2:
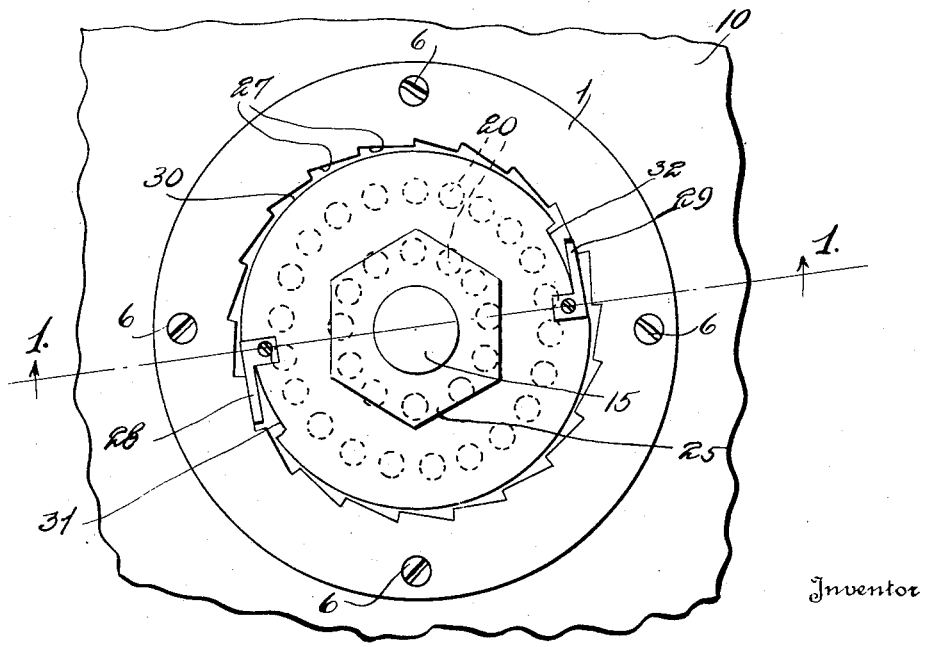

In the drawing:

Figure 1 is a vertical transverse section of the washer, taken on the line 1—1 of Figure 2; and Figure 2 is a plan view of the device shown in Figure 1.

The improved washer comprises: a pair of rings 1 and 2, having annular rabbets 3 and 4 formed in their respective adjacent inner peripheries. The lower ring 2 is provided with suitably spaced apart apertures 5 internally screwthreaded to receive the threads of machine screws 6 which pass freely through apertures 7 formed in the upper ring 1 and registering with the apertures 5 of the lower ring.

A washer plate or disk 8 is rabbeted to form a flange 9 fitting snugly and rotatably in the rabbet 4. This disk 8 is slightly thicker than the ring 2 in order that its lower face may be supported wholly by a plate 10 which constitutes one of two or more members to be clamped together by the mechanism including this washer as an element. The other member is shown in Figure 2 as a plate 11. These two plates 10 and 11 are provided with registering apertures 12 and 13, respectively, to receive the shank 14 of a bolt 15 having a head 16 at one end to seat against the lower face of plate 11.

The washer plate 8 is provided at its center with an aperture 17 adapted to receive shank 14 and to register with the apertures 12 and 13 in the plates 10 and 11. This plate 8 is provided with annular ball races 18 and 19 concentric with aperture 17, and ball bearings 20 are mounted to roll and rotate in these races.

A top washer plate or disk 21, similar to plate 8, is provided with a central aperture 22 adapted to slide freely but snugly over the shank of bolt 15. This disk 21 is provided with concentric ball races 23 and 24 to receive and seat on the concentric annular rows of ball bearings rolling in the races 18 and 19 of the lower disk or washer 8. A nut 25 of bolt 15 serves to draw the plates 10 and 11, into clamped contact, when sufficiently drawn up on the threaded shank against the top washer plate 21.

The upper washer plate 21 is rabbeted to form a flange 26 which rotates freely in the rabbet 3 of the ring 1. The inner periphery of ring 1 is notched to form an annular ratchet 27, the teeth of which are in contact with pawls 28 and 29 secured to the inner peripheral edge 30 of the top washer plate 21 diametrically opposite to one another. The edge 30 is provided with notches 31 and 32 to receive the pawls 28 and 29, as they are forced inwardly by rotation past the teeth 27 of the ratchet. The lower washer plate 8 and ring 2 may also be formed to provide the ratchet and pawl construction similar to that just described for the upper plate 21 and ring 1.

The rings 1 and 2 serve mainly to hold the washer plates and ball bearings in assembled relation, and the washers might be used without the ratchet and pawl locking mechanism. The main purpose of the ball bearing washer is to provide one washer plate having a surface in frictional contact with one of the plates or objects to be clamped together. As the plates 10 and 11 are brought closer together, the washer plate 8 becomes more securely and non-rotatably fixed to the plate 10; but the nut 25 and washer plate 21 are still free to rotate together on washer plate 8. In fact, the plate 21 really forms a broad base for the nut 25.

Where the ordinary washer would present great frictional resistance to the rotation of the nut 25, after the plates 10 and 11 had been brought into fairly close contact with each other; the ball bearing feature of the present invention permits the nut 25 to be drawn up still further, since the ball bearing plate 21 practically eliminates all frictional resistance to turning. This means that the plates 10 and 11 can be drawn up closer to each other with the same amount of turning effort on the nut 25 than would be possible with the ordinary nut and washer construction.

The ratchet and pawl lock arrangement is not necessary so far as the tightening action of the washer is concerned. It may be desirable to use it in cases where excessive vibration might tend to loosen the washer. Any other form of suitable lock mechanism may be used instead of the pawl and ratchet lock illustrated and described herein.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim is:

1. A washer comprising a pair of centrally apertured disks, anti-friction members interposed between said disks, a pair of rings embracing said disks to hold them in assembled relation, and co-operating pawl and ratchet mechanism on said disks and rings to limit the relative rotation of said disks and said rings in one direction only.

2. A washer comprising a pair of centrally apertured disks, anti-friction members interposed between said disks, a pair of rings embracing said disks to hold them in assembled relation to each other, said rings being provided on their inner peripheries with ratchet teeth, and pawls mounted on the peripheries of said disks to engage the ratchet teeth and limit the rotation of each of said disks to rotation in one direction only in the ring embracing it.

3. A washer comprising a pair of centrally apertured disks, anti-friction members interposed between said disks, means for holding the disks and members in relatively rotatable and assembled relation, and means for limiting the rotation of the disks relative to the first named means in one direction only.

DANIEL M. MAHONEY.